A. DE AGUIAR.
SCALE.
APPLICATION FILED JULY 1, 1918.
1,333,473.
Patented Mar. 9, 1920.
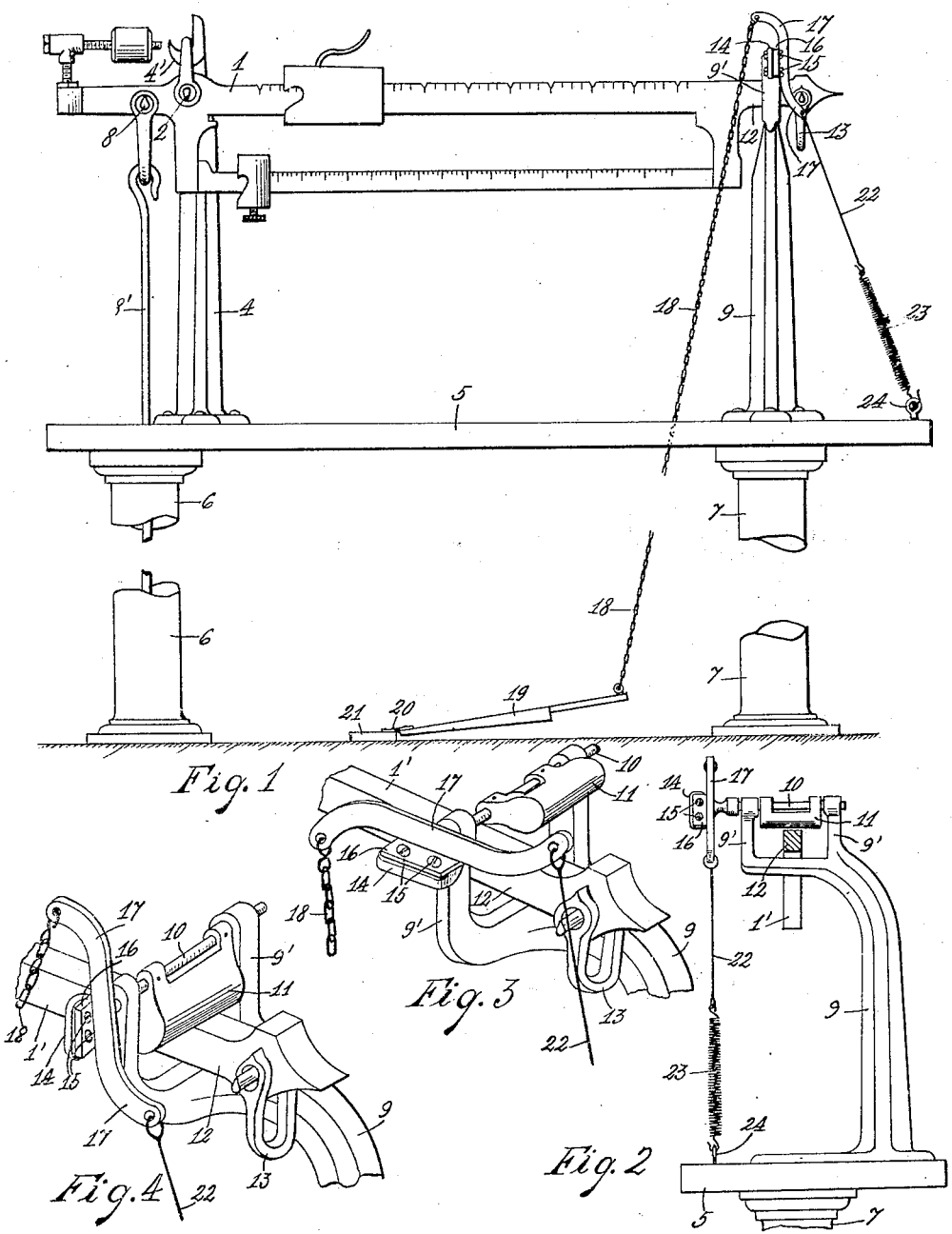
INVENTOR.
Abelardo de Aguiar,
BY
B. Singer,
ATTORNEYS.

UNITED STATES PATENT OFFICE.

ABELARDO DE AGUIAR, OF HABANA, CUBA.

SCALE.

1,333,473.     Specification of Letters Patent.     Patented Mar. 9, 1920.

Application filed July 1, 1918. Serial No. 242,940.

*To all whom it may concern:*

Be it known that I, ABELARDO DE AGUIAR, a citizen of the Republic of Cuba, and a resident of Habana, Republic of Cuba, have invented certain new and useful Improvements in Scales, of which the following is a full, clear, and exact specification.

This invention relates to weighing-scales, and its object is to provide an improvement on the invention for which application was filed in the U. S. Patent Office on January 15th, 1918, Serial No. 211,908. The object of this improvement is to adapt the principles of said invention to those scales not having a wooden frame and which are mounted on metal columns, which class of weighing devices are being manufactured lately. This invention covers mainly a variation in the connection with the gyratory stop-piece of the scale beam of the treadle-operated means which are under the elastic action of a spring, in order to normally maintain the gyratory stop-piece in its fallen position, that is, locking the scale-beam, and to raise said gyratory stop-piece leaving free the scale beam when said treadle is operated, affording simplicity and economical advantages in its construction.

In the annexed drawings:

Figure 1 is a front elevation of a column supported scale, showing applied thereto the improvement which is the object of this invention.

Fig. 2 is an end elevation, partially in section, of said scale.

Fig. 3 is a perspective detail showing the free position of the end of the scale-beam.

And Fig. 4 is a perspective detail showing the same end of the scale-beam in its locked position.

Supposing a scale comprising a scale-beam 1 suspended at 2 by means of a clasp 3 from a hook 4 formed on the upper end of a standard fixed on a horizontal plate 5 supported on two metal columns 6 and 7 fixed to the ground, leading from the short arm 8 of said scale-beam the hook end rod 8' extending to the platform (not shown) of the scale through column 6 and transmitting to the scale the action of the weight placed on such platform, and 9 being another standard fixed on plate 5 and which gyratorily supports on its upper forked portion 9' a horizontal shaft 10 to which stop-piece 11 is secured, said fork 9' clasping the end 12 of the forked-shaped graduated arm 1' of the scale beam from which hangs the balancing weights by means of the pending clasp 13, and 14 being the crank or plain small handle fixed on one end of the shaft 10 exteriorly to the fork 9', which is generally used for turning the stop-piece 11, the invention consists in securing on said small plain handle 14 by means of screws 15 a lug 16 angularly projecting from the central portion of a lever 17 of similar oppositely curved arms, one of which arms is connected on its end by means of a chain or cable 18 with the end of a treadle 19 mounted through a hinge 20 on a plate 21 secured on the floor adjacent to platform of the scale, and the end of the opposite arm of said lever 17 is connected by means of a wire 22 and a helical spring 23 connected therewith, to an eye-bolt 24 fixed on one end of horizontal plate 5.

The operation of the scale is as follows: The helical spring 14 normally tends to maintain in a fallen position the gyratory stop-piece 11 so that the latter may lock the end of the weighing arm 1' (Fig. 4), but when the treadle 19 is pressed on the floor, the chain 18 pulls downward the arm of lever 17 with which same is connected against the elastic action of spring 23, whereby lever 17 is caused to be rotated and at the same time rotating therewith the shaft 10 carrying the stop-piece 11, which is raised thus leaving free the end 12 of the weighing arm 1' and being thus maintained in locked position until the treadle is operated again.

Having thus described my invention, what I claim is:

In a scale, the combination of a scale beam, a stop piece for the scale beam and having a pivot shaft provided with a cross handle at one end, supports in which said shaft is mounted, a lever having a lug at its central portion secured to the said handle of the shaft, a cord, including a spring, connecting one end of the lever to a fixed point and normally holding the stop piece in position to lock the scale beam, a treadle, and a cord or the like connecting the treadle to the other end of the lever.

In witness whereof I affix my signature.

ABELARDO DE AGUIAR.